United States Patent
Strobel

(10) Patent No.: US 7,147,933 B2
(45) Date of Patent: *Dec. 12, 2006

(54) TIN-SILVER COATINGS

(75) Inventor: Richard W. Strobel, Cheshire, CT (US)

(73) Assignee: SnAg, LLC, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/079,945

(22) Filed: Mar. 15, 2005

(65) Prior Publication Data

US 2005/0158529 A1    Jul. 21, 2005

Related U.S. Application Data

(63) Continuation of application No. 09/991,287, filed on Nov. 14, 2001, now Pat. No. 6,924,044.

(60) Provisional application No. 60/312,331, filed on Aug. 14, 2001.

(51) Int. Cl.
B32B 15/01 (2006.01)
C23C 2/08 (2006.01)
H01R 13/03 (2006.01)

(52) U.S. Cl. .................. 428/647; 428/929; 428/939; 439/886; 427/433

(58) Field of Classification Search ................ 428/646, 428/647, 648, 939, 929; 427/433; 420/557, 420/560; 439/886, 887
See application file for complete search history.

(56) References Cited

U.S. PATENT DOCUMENTS

| | | |
|---|---|---|
| 2,530,413 A | 11/1950 | Warth |
| 3,503,721 A | 3/1970 | Lupfer |
| 3,562,605 A | 2/1971 | Feree et al. |
| 3,638,083 A | 1/1972 | Dornfeld et al. |
| 3,743,986 A | 7/1973 | McInturff et al. |
| 4,170,472 A | 10/1979 | Olsen et al. |
| 4,758,407 A | 7/1988 | Ballentine et al. |
| 4,778,733 A | 10/1988 | Lubrano et al. |
| 4,879,096 A | 11/1989 | Naton |
| 5,028,492 A | 7/1991 | Guenin |
| 5,075,176 A | 12/1991 | Brinkmann |
| 5,136,360 A | 8/1992 | Harada et al. |
| 5,393,485 A | 2/1995 | Worz et al. |
| 5,393,489 A | 2/1995 | Gonya et al. |
| 5,435,968 A | 7/1995 | Panthofer |
| 5,439,639 A | 8/1995 | Vianco et al. |
| 5,514,261 A | 5/1996 | Herklotz et al. |
| 5,766,776 A | 6/1998 | Buresch |

(Continued)

FOREIGN PATENT DOCUMENTS

EP    0629466 A1    12/1994

(Continued)

OTHER PUBLICATIONS

ASM Handbook, vol. 8, Mechanical Testing, 1995, "Hardness Testing," pp. 71-113.

*Primary Examiner*—John J. Zimmerman
(74) *Attorney, Agent, or Firm*—Wolf, Greenfield & Sacks, P.C.

(57) ABSTRACT

The present invention relates to improved coatings for electrical or electronic connectors such as contacts or terminals used in automotive applications. Coatings in accordance with the present invention preferably comprise binary tin-silver coatings consisting of more than 1.0 wt % to about 20 wt %, preferably from 2.0 wt % to 15 wt %, and most preferably from 3.0 wt % to 10 wt %, silver and the balance essentially tin. The coating is preferably applied by immersing the substrate material in a molten tin-silver bath.

49 Claims, 1 Drawing Sheet

U.S. PATENT DOCUMENTS

| | | |
|---|---|---|
| 5,780,172 A | 7/1998 | Fister et al. |
| 5,853,557 A * | 12/1998 | Souza et al. ............... 205/109 |
| 5,902,472 A | 5/1999 | Arai et al. |
| 5,911,866 A | 6/1999 | Oshima et al. |
| 5,916,695 A | 6/1999 | Fister et al. |
| 5,948,235 A | 9/1999 | Arai |
| 6,143,700 A | 11/2000 | Kato |
| 6,207,035 B1 | 3/2001 | Adler et al. |
| 6,231,691 B1 | 5/2001 | Anderson et al. |
| 6,638,643 B1 * | 10/2003 | Schleicher et al. ......... 428/647 |
| 6,641,930 B1 * | 11/2003 | Schleicher et al. ......... 428/647 |
| 2001/0004048 A1 | 6/2001 | Adler et al. |
| 2002/0096662 A1 | 7/2002 | Schleicher et al. |
| 2002/0134200 A1 | 9/2002 | Nishimura et al. |

FOREIGN PATENT DOCUMENTS

| | | |
|---|---|---|
| GB | 718 982 A | 11/1954 |
| JP | 60 092459 A | 5/1985 |
| JP | 62 072496 A2 | 4/1987 |
| JP | 04-218275 | 8/1992 |
| JP | 11 191322 A2 | 7/1999 |
| JP | 2000 061683 A | 2/2000 |
| JP | 2000 080460 | 3/2000 |
| JP | 2000 319793 A2 | 11/2000 |
| JP | 2001-043744 | 2/2001 |
| JP | 2001 246493 A2 | 9/2001 |
| JP | 2002-212700 | 7/2002 |
| WO | WO 0131074 A1 | 5/2001 |

* cited by examiner

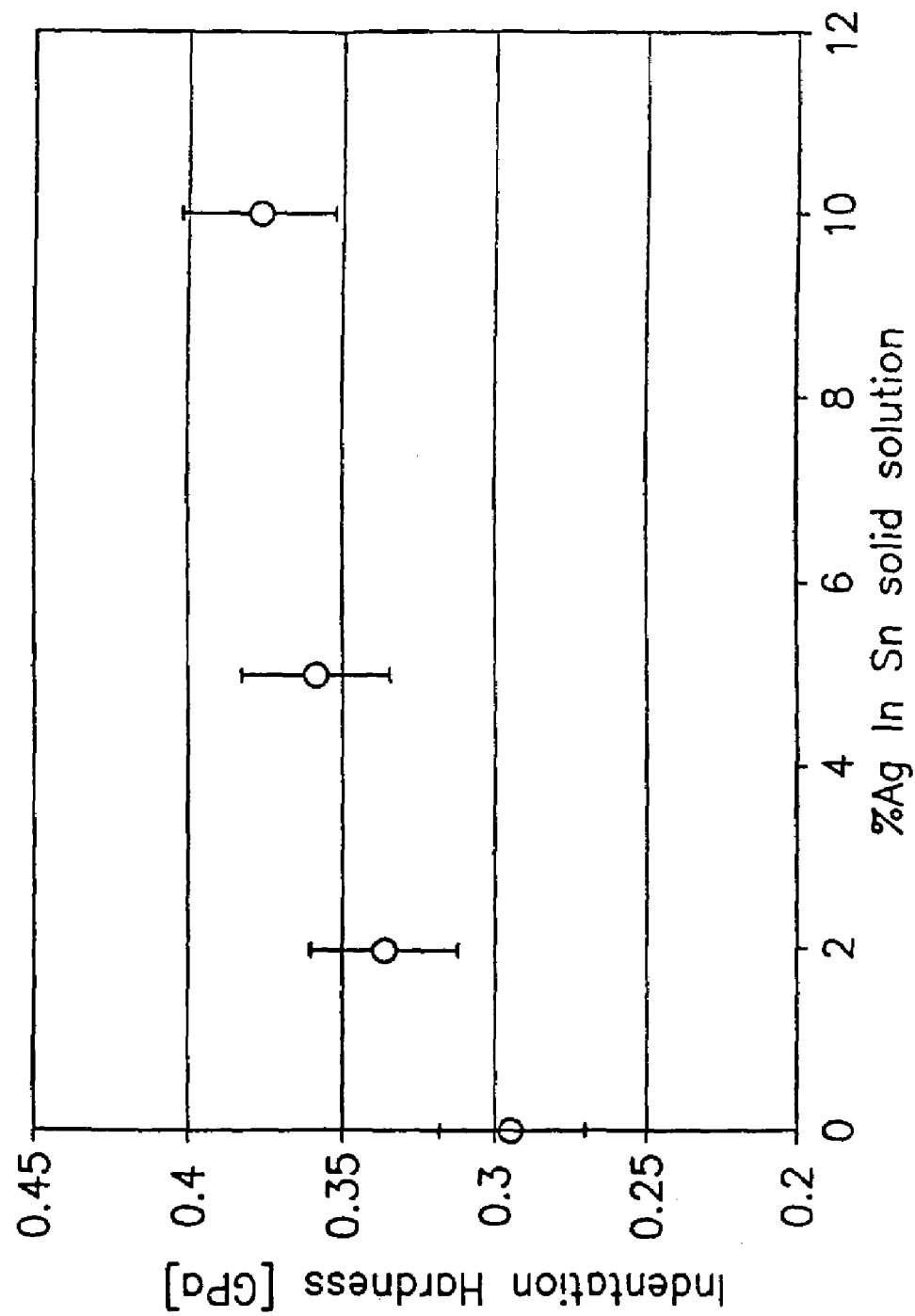

TIN-SILVER COATINGS

RELATED APPLICATIONS

This non-provisional application is a continuation of U.S. non-provisional application Ser. No. 09/991,287, filed Nov. 14, 2001, now U.S.Pat No. 6,924,044, which claims the benefit of U.S. Provisional Patent Application Ser. No. 60/312,331, filed Aug. 14, 2001, entitled TIN-SILVER COATINGS, both of which are incorporated herein by reference.

BACKGROUND OF THE INVENTION

The present invention relates to tin-silver coatings to be applied to substrate materials used in electrical and electronic applications, such as in automotive connectors, and to a method of applying a tin-silver coating to the substrate materials.

Electrical contacts in automobiles are subjected to a variety of hazards because of the elevated temperatures and environment in which they must function. For example, automotive electrical contacts are routinely subjected to vibrations and fretting corrosion caused by micromotion. Fretting corrosion is a detriment because it elevates contact resistance at the contacts of the electrical surface. Additionally, electrical arcing can occur when two electrical contacts or terminals are mated together.

To deal with some of these problems, some automotive electrical contacts have been coated with gold. Gold is an advantageous material because it does not lead to the production of deleterious oxides. The cost of gold however is very high and unduly increases the cost of the automotive electrical contact.

To eliminate the expense of the gold, some electrical contacts have been coated with pure tin. While economically beneficial, a pure tin coating does not have a very long cycle life, normally about 170 cycles.

Thus, there remains a need for a coating which can be used in the formation of electrical contacts which is economically beneficial and which can withstand the stresses of the environment under which automotive electrical contacts must function.

SUMMARY OF THE INVENTION

Accordingly, it is an object of the present invention to provide an improved coating for electrical and electronic applications.

It is a further object of the present invention to provide an improved coating as above which has particular use in automotive applications and which has a long cycle life. It is a further object of the present invention to provide an improved coating as above for an automotive electrical contact which is economically acceptable.

It is a further object of the present invention to provide an improved method for forming a coating on a substrate material.

It is yet another object of the present invention to provide an improved method for forming an electrical connector or contact.

The foregoing objects are attained by the tin-silver coatings and the method of the present invention.

In accordance with the present invention, a tin-silver coating is applied to a substrate material to be used for an electrical contact. The substrate material may be any suitable metal having a desired electrical conductivity. For example, the substrate material can be copper, a copper alloy, a carbon steel material, or an aluminum alloy. The tin-silver coating of the present invention in a preferred embodiment consists of from more than 1.0 wt % to about 20 wt %, preferably from 2.0 wt % to 15 wt %, and most preferably from 3.0 wt % to 10 wt %, silver and the balance essentially tin. As will be discussed hereinafter, the binary tin-silver coatings of the present invention are particularly advantageous coatings. For example, the coatings avoid the creation of oxides which are deleterious to the coating and which increase the electrical resistance properties of the coating.

While it is preferred that the coatings of the present invention be binary tin-silver coatings, the coatings may also contain an effective amount up to about 5.0 wt % of at least one hardening element selected from the group consisting of bismuth, silicon, copper, magnesium, iron, nickel, manganese, zinc, antimony, and mixtures thereof. The at least one hardening element when present in the coating should not be present in an amount which causes the production of oxides which increase the electrical resistance of the coating.

One advantage to the tin-silver coatings of the present invention is that they do not need to include elements such as deoxidizing agents.

The tin-silver coatings of the present invention are formed using a method which broadly comprises the steps of providing a substrate material to be coated, preparing a bath consisting of from more than 1.0 wt % to about 20 wt % silver and the balance essentially tin, and immersing the substrate material in the bath to form a coating layer on the substrate material, which coating layer consists of more than 1.0 wt % to about 20 wt % silver and the balance essentially tin. In an alternative embodiment of the method of the present invention, the bath and the coating may also contain at least one element selected from the group consisting of bismuth, silicon, copper, magnesium, iron, nickel, manganese, zinc, antimony, and mixtures thereof. When present, the at least one element should be present in an amount which does not cause the generation of oxides which increase the resistance of the coating.

Other details of the tin-silver coatings of the present invention and the method for forming them, as well as other objects and advantages attendant thereto, are set forth in the following detailed description and the accompanying drawing(s).

BRIEF DESCRIPTION OF THE DRAWINGS

The FIGURE illustrates the result of a hardness test comparing the hardness of a pure tin coating as compared to tin-silver coatings in accordance with the present invention.

DETAILED DESCRIPTION

As previously mentioned, the present invention relates to the application of a tin-silver coating on a substrate material to be used in electrical and electronic applications such as an electrical contact for an automobile. The substrate material may be any suitable electrically conductive material known in the art such as a ferrous based material, e.g., carbon steel material, or a non-ferrous based material, e.g., pure copper, a copper based alloy, or an aluminum alloy. One substrate material which is typically used in automotive applications is a copper-tellurium alloy designated as CDA Alloy 14530 which contains from 0.003 to 0.023 tellurium, from 0.003 to 0.023 tin, from 0.001 to 0.010 phosphorous and the balance copper.

In most electrical and electronic applications, it is highly desirable to have a coating layer on at least a portion of the substrate material to help prevent surface oxidation which causes fretting corrosion and increased electrical resistance. The coating must have sufficient hardness to withstand the forces applied in such applications during a large number of cycles, and a resistance value which is not too great. It has been found that a particularly useful composition for a coating to be applied to a substrate material for use in electrical and electronic applications, such as automotive applications, is a binary tin-silver coating which consists of more than 1.0 wt % to about 20 wt %, preferably from 2.0 wt % to 15 wt %, most preferably from 3.0 wt % to 10 wt %, silver and the balance essentially tin. Such coatings have a melting point greater than 225° C., which is advantageous.

If desired, at least one hardening element selected from the group consisting of bismuth, silicon, copper, magnesium, iron, nickel, manganese, zinc, antimony, and mixtures thereof may be present in an alternative embodiment of the tin-silver coatings of the present invention to increase the hardness properties of the coatings. When present, the at least one hardening element may be present in an effective amount up to about 5.0 wt % total and preferably in an amount from 0.1 wt % to about 5.0 wt % total. The particular hardening element or elements selected should not be present in an amount which creates deleterious oxides sufficient to increase the electrical resistance properties of the coatings. For example, one should avoid the use of significant amounts of oxide producing elements such as magnesium and copper in the coatings.

The tin-silver coatings of the present invention may be applied to a substrate material using any suitable technique known in the art. It is preferred however to apply the tin-silver coating to the substrate material using a non-electroplating technique. For example, the coatings of the present invention may be formed by immersing the substrate material into a tin-silver bath maintained at a temperature of at least 500° F. and preferably at a temperature in the range of from 500° F. to about 900° F. The bath in a preferred embodiment comprises molten tin and silver and has a composition consisting of more than 1.0 wt % to about 20 wt %, preferably from 2.0 wt % to 15 wt %, most preferably from 3.0 wt % to 10 wt %, silver and the balance essentially tin. The substrate material being immersed in the bath may be a continuous strip of metal or may be pieces of metal pre-stamped to form a particular type of electrical or electronic connector. Alternatively, the coated substrate material may be processed into a particular type of electrical or electronic connector after it has been removed from the bath. For example, the coated substrate material may be stamped into a particular type of electrical or electronic connector after it has been removed from the bath.

Optionally, the coating bath may also contain an effective amount up to about 5.0 wt %, preferably from 0.1 wt % to about 5.0 wt %, of at least one hardening element selected from the group consisting of bismuth, silicon, copper, magnesium, iron, nickel, manganese, zinc, antimony, and mixtures thereof. For example, the bath may contain from 0.1 wt % to 1.5 wt % copper.

As previously mentioned, the substrate material to be immersed in the bath may have any desired form such as a coil of substrate material. The substrate material may be run through the bath either continuously or discontinuously using any suitable system known in the art. Further, in a preferred embodiment of the present invention, the substrate material to be coated may be resident in the bath for a time period in the range of from 0.2 seconds to 10 seconds to form a coating having a thickness in the range of from 0.00001" to 0.001".

It has been found by adding silver in the above specified amounts to tin, one forms a coating with a hardened coating surface. This is desirable because the harder the surface, the longer its cycle life. As previously mentioned, pure tin coatings have a cycle life of 170 cycles before the contact resistance rises above the standard of 10 milliohms. By adding 2.0 wt % silver to the tin, it has been found that the cycle life can be increased to 250 cycles before the contact resistance rises above the aforementioned standard. It has also been found that by adding 5.0 wt % silver to the tin, the cycle life can be increased to 900 cycles before the contact resistance rises above the aforementioned standard.

It has also been found that by adding 5.0 wt % silver to the coating, the coating stays in a homogeneous state during the coating process. In other words, the silver does not separate from the tin. This means that after the coating cools, the silver does not suspend or separate.

While the tin-silver coatings of the present invention are more expensive than pure tin coatings, they are substantially less in cost than gold coatings. Thus, the coatings of the present invention offer substantial economic savings.

It has also been found that the life cycle of the coatings of the present invention may further be increased by applying a lubricant, such as a synthetic hydrocarbon based grease, to the surfaces of the substrate material after formation of the tin-silver coating. It is expected that coatings having as much as 10 wt % silver in the tin coating will have a life cycle of 1 million cycles when such a lubricant is used—a substantial increase over current life cycles.

The addition of silver in the above specified amounts to the coating has other benefits. For example, the presence of silver increases the surface melting point. Further, the presence of the silver helps eliminate fusing or arcing of the coated contacts or terminals. This is a highly desirable result because power sources for cars are increasing to a 42 volt system.

Coatings formed in accordance with the present invention are also free of silver sulfamates and deleterious oxides.

Other advantages to the coatings of the present invention include the absence of any inorganic materials in the coatings, the presence of a strong metallurgical bond between the coatings and the substrate materials, increased lubricity which enhances tool life, and the presence of excellent electrical conductivity properties in excess of 15.6% IACS, e.g. a 95% tin—5% silver coating has an electrical conductivity of 16.6% IACS and a 90% tin—10% silver coating has an electrical conductivity greater than 20% IACS. Further, there is no need to add brighteners to the bath forming the coating.

In order to demonstrate the improvements offered by the coatings of the present invention, specimens were produced in accordance with the method of the present invention which contained a substrate formed from a commercially available copper alloy designated as Alloy 4252 coated with pure tin, a substrate formed from the same material coated with 98 wt % tin and 2 wt % silver, a substrate formed from the same material coated with 95 wt % tin and 5 wt % silver, and a substrate formed from the same material coated with 90% tin and 10 wt % silver. The specimens were then tested to determine both the cycles before resistance increases to 10 milliohms and the resistance value. The test showed that on the average a pure tin coated substrate lasted 289 cycles before reaching 10 milliohms and had a resistance value which ranged from 10.09 to 10.88. The test also showed that the 98-2 coating had an average cycle life of 452 cycles and a resistance value that ranged from 10.16 to 10.74; that the 95-5 coating had an average cycle life of 399 cycles and a resistance value which ranged from 10.11 to 10.82; and that the 90-10 coating had an average cycle life of 157 cycles and a resistance value which ranged from 10.09 to 10.83. It was also found that as the silver content of the coating increased that the melting point of the coating increased. For example, a pure tin coating has a melting point of 231° C., the 95-5 tin-silver coating has a melting point in the range of 245° C. to 253° C., and the 90-10 tin-silver coating has a melting point of 310° C.

Another test was conducted to determine the hardness of tin-silver coatings in accordance with the present invention as compared to pure tin coatings. The test was conducted using nanoindentation to determine whether the indentation hardness of tin-based films was affected by the additions of silver. To conduct the test specimens were prepared with a pure tin coating on a copper alloy substrate, a 98 wt % tin—2 wt % silver coating on a copper alloy substrate, a 95 wt % tin—5 wt % silver coating on a copper alloy substrate, and a 90 wt % tin—10 wt % silver coating on a copper alloy substrate. Each of the tin based coatings were approximately 3000 nm thick. In order to eliminate interference from the substrate, the maximum indentation depth for the tin based coatings was less than 33% of the coating thickness. At least three indentation tests were conducted on each sample with a tin based coating.

The results of the hardness test on the tin based films shows that hardness increases with increasing silver content in the coating. The indentation hardness for the pure tin coating was 0.3 GPa, whereas the hardness for the 98-2 tin coating, the 95-5 tin coating and the 90-10 tin coating were from 0.32 GPa to 0.41 Gpa. The FIGURE illustrates the hardness range for each of the tin-silver coatings. The test clearly illustrates the improvements in hardness to be obtained by using a tin-silver coating in accordance with the present invention.

While the coatings of the present invention have been described in the context of automotive applications, it should apparent to those skilled in the art that the coatings have utility in other electrical contact or electrical terminal environments.

It is apparent that there has been provided a tin-silver coating which fully satisfies the objects, means and advantages set forth hereinbefore. While the present invention has been described in the context of specific embodiments, other alternatives, modifications, and variations will become apparent to those skilled in the art having read the foregoing description. Accordingly, it is intended to embrace such alternatives, modifications and variations as fall within the broad scope of the appended claims.

What is claimed is:

1. A mating electrical connector comprising:
   an electrically conductive material; and
   a coating formed on at least a portion of the electrically conductive material, the coating consisting essentially of tin and from 2.0 wt % to about 20 wt % silver, the coating having a thickness in the range of from 0.00001" to 0.001".

2. A mating electrical connector according to claim 1, wherein the silver content in the coating is in the range of from 3.0 wt % to 15 wt %.

3. A mating electrical connector according to claim 1, wherein the silver content in the coating is in. the range of from 3.0 wt % to 10 wt %.

4. A mating electrical connector according to claim 1, wherein the coating has a nanoindentation hardness in the range of from 0.32 to 0.41 GPa.

5. A mating electrical connector according to claim 1, wherein the coating is non-electroplated.

6. A mating electrical connector according to claim 1, wherein the coating consists of tin and from 2.0 wt % to about 20 wt % silver.

7. A mating electrical connector according to claim 1, wherein the coating has a melting point greater than 225 ° C.

8. A mating electrical connector according to claim 1, wherein the electrical connector is an automotive mating electrical connector.

9. A mating electrical connector comprising:
   an electrically conductive material; and
   a coating formed on at least a portion of the electrically conductive material, the coating comprising tin, from 2.0 wt % to 20 wt % sliver, and up to 5.0 wt % of at least one element selected from among bismuth, silicon, copper, magnesium, iron, nickel, manganese, zinc, and/or antimony, the coating having a thickness in the range of from 0.00001" to 0,001".

10. A mating electrical connector according to claim 9, wherein the silver content of the coating is in the range of from 3.0 wt % to 15 wt %.

11. A mating electrical connector according to claim 9, wherein the silver content of the coating is in the range of from 3.0 wt % to 10 wt %.

12. A mating electrical connector according to claim 9, wherein the at least one element is present in an amount ranging from 0.1 wt % to 5.0 wt %.

13. A mating electrical connector according to claim 9, wherein the coating has a nanoindentation hardness in the range of from 0.32 to 0.41 GPa.

14. A mating electrical connector according to claim 9, wherein the coating is non-electroplated.

15. A mating electrical connector according to claim 9, wherein the coating is formed on at least a portion of the electrically conductive material, the coating consisting essentially of tin, from 2.0 wt % to 20 wt % silver, and up to 5.0 wt % of at least one element selected from among bismuth, silicon, copper, magnesium, iron, nickel, manganese, zinc, and/or antimony.

16. A mating electrical connector according to claim 9, wherein the coating is formed on at least a portion of the electrically conductive material, the coating consisting of tin, from 2.0 wt % to 20 wt % silver, and up to 5.0 wt % of at least one element selected from among bismuth, silicon, copper, magnesium, iron, nickel, manganese, zinc, and/or antimony.

17. A mating electrical connector according to claim 9, wherein the coating has a melting point greater than 225° C.

18. A mating electrical connector according to claim 9, wherein the electrical connector is an automotive mating electrical connector.

19. A mating electrical connector comprising:
   an electrically conductive material; and
   a coating formed on at least a portion of the electrically conductive material, the coating comprising tin and from 2.0 wt % to about 20 wt % silver, the coating having a thickness in the range of from 0.00001" to 0001" and a nanoindentation hardness in the range of from 0.32 to 0.41 GPa.

20. A mating electrical connector according to claim 19, wherein the silver content in the coating is in the range of from 3.0 wt % to 15 wt %.

21. A mating electrical connector according to claim 19, wherein the silver content in the coating is in the range of from 3.0 wt % to 10 wt %.

22. A mating electrical connector according to claim 19, wherein the coating is non-electroplated.

23. A mating electrical connector according to claim 19, wherein the coating consists essentially of tin and from 2.0 wt % to 20 wt % silver.

24. A mating electrical connector according to claim 19, wherein the coating further comprises at least one element selected from among bismuth, silicon, copper, magnesium, iron, nickel, manganese, zinc, and/or antimony.

25. A mating electrical connector according to claim 19, wherein the coating has a melting point greater than 225° C.

26. A mating electrical connector according to claim 19, wherein the electrical connector is an automotive mating electrical connector.

27. A process comprising forming a mating electrical connector from a coated substrate material produced according to a process comprising:
providing a substrate material to be coated;
preparing a molten metal bath;
immersing the substrate material in the bath; and
forming the coated substrate material including a coating layer having a thickness in the range of from 0.00001" to 0.001" on the substrate material, the coating layer consisting essentially of tin and from 2.0 wt % to about 20 wt % silver.

28. A process according to claim 27, further comprising maintaining the bath at a temperature of from 500° F. to 900° F. during the immersing step.

29. A process according to claim 27, wherein the immersing step comprises continuously passing the substrate material through the bath.

30. A process according to claim 27, further comprising keeping the substrate material resident in the bath for a time period in the range of 0.2 seconds to 10 seconds.

31. A process according to claim 27, wherein the coating has a nanoindentation hardness in the range of from 0.32 to 0.41 GPa.

32. A process according to claim 27, wherein the bath comprises tin.

33. A process according to claim 27, wherein the bath consists essentially of tin and from 2.0 wt % to about 20 wt % silver.

34. A process according to claim 27, wherein the coating layer consists of tin and from 2.0 wt % to about 20 wt % silver.

35. A process comprising forming a mating electrical connector from a coated substrate material produced according to a process comprising:
providing a substrate material to be coated;
preparing a molten metal bath;
immersing the substrate material in the bath; and
forming the coated substrate material including a coating layer having a thickness in the range of from 0.00001" to 0.001" on the substrate material, the coating layer comprising tin, from 2.0 wt % to 20 wt % silver, and up to 5.0 wt % of at least one element selected from among bismuth, silicon, copper, magnesium, iron, nickel, manganese, zinc, and/or antimony.

36. A process according to claim 35, wherein the immersing step comprises continuously passing the substrate material through the bath.

37. A process according to claim 35, further comprising maintaining the bath at a temperature in the range of 500° F. to 900° F.

38. A process according to claim 35, further comprising keeping the substrate material resident in the bath for a time period in the range of 0.2 seconds to 10 seconds.

39. A process according to claim 35, wherein the coating has a nanoindentation hardness in the range of from 0.32 to 0.41 GPa.

40. A process according to claim 35, wherein the coating layer comprises front 3.0 wt % to 10 wt % silver.

41. A process according to claim 35, wherein the bath comprises tin.

42. A process according to claim 35, wherein the bath consists essentially of tin, from 2.0 wt % to 20 wt % silver, and up to 5.0 wt % of at least one clement selected from among bismuth, silicon, copper, magnesium, iron, nickel, manganese, zinc, and/or antimony.

43. A process according to claim 35, wherein the bath consists of tin, from 2.0 wt % to 20 wt % silver, and up to 5.0 wt % of at least one element selected from among bismuth, silicon, copper, magnesium, iron, nickel, manganese, zinc, and/or antimony.

44. A process comprising forming a mating electrical connector from a coated substrate material produced according to a process comprising:
providing a substrate material to be coated;
preparing a molten metal bath;
immersing the substrate material in the bath; and
forming the coated substrate material including a coating layer having a thickness in the range of from 0.00001" to 0.001" on the substrate material, the coating layer comprising tin and from 2.0 wt % to 20 wt % silver, the coating layer having a nanoindentation hardness in the range of from 0.32 to 0.41 GPa.

45. A process according to claim 44, further comprising maintaining the bath at a temperature of from 500° F. to 900° F. during the immersing step.

46. A process according to claim 44, wherein the immersing step comprises continuously passing the substrate material through the bath.

47. A process according to claim 44, further comprising keeping the substrate material resident in the bath for a time period in the range of 0.2 seconds to 10 seconds.

48. A process according to claim 44, wherein the coating further comprises at least one element selected front among bismuth, silicon, copper, magnesium, iron, nickel, manganese, zinc, and/or antimony.

49. A process according to claim 44, wherein the bath consists essentially of tin and from 2.0 wt % to 20 wt % silver.

* * * * *

UNITED STATES PATENT AND TRADEMARK OFFICE
CERTIFICATE OF CORRECTION

PATENT NO. : 7,147,933 B2 Page 1 of 1
APPLICATION NO. : 11/079945
DATED : December 12, 2006
INVENTOR(S) : Richard Strobel It is certified that error appears in the above-identified patent and that said Letters Patent is hereby corrected as shown below:

Col. 6, Claim 9, line 18, replace "sliver" with --silver--;

Col. 6, Claim 9, line 22, replace "0,001" with --0.001--;

Col. 6, Claim 19, line 63, replace "0001" with --0.001--;

Col. 8, Claim 40, line 16, replace "front" with --from--;

Col. 8, Claim 42, line 21, replace "clement" with --element--; and

Col. 8, Claim 48, line 52, replace "front" with --from--.

Signed and Sealed this

Twentieth Day of February, 2007

JON W. DUDAS
*Director of the United States Patent and Trademark Office*